United States Patent
Rodrigues et al.

(10) Patent No.: US 10,647,905 B2
(45) Date of Patent: May 12, 2020

(54) METHODS FOR EVALUATING PERFORMANCE OF CEMENT FLUID-LOSS-CONTROL ADDITIVES FOR FIELD APPLICATIONS

(71) Applicant: Halliburton Energy Services, Inc., Houston, TX (US)

(72) Inventors: Elias D. Rodrigues, Rio de Janeiro (BR); Rafael M. Oliveira, Rio de Janeiro (BR); Flavio H. Marchesini, Rio de Janeiro (BR)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 173 days.

(21) Appl. No.: 15/744,567

(22) PCT Filed: Aug. 5, 2015

(86) PCT No.: PCT/US2015/043870
§ 371 (c)(1),
(2) Date: Jan. 12, 2018

(87) PCT Pub. No.: WO2017/023319
PCT Pub. Date: Feb. 9, 2017

(65) Prior Publication Data
US 2018/0201824 A1    Jul. 19, 2018

(51) Int. Cl.
C09K 8/487    (2006.01)
E21B 33/13    (2006.01)
(Continued)

(52) U.S. Cl.
CPC .............. *C09K 8/487* (2013.01); *C04B 28/02* (2013.01); *E21B 33/13* (2013.01);
(Continued)

(58) Field of Classification Search
CPC ......... C09K 8/487; C09K 28/02; E21B 33/13; E21B 47/0005; C04B 2103/0088;
(Continued)

(56) References Cited

U.S. PATENT DOCUMENTS 6,448,311 B1    9/2002 Walker
2004/0159431 A1    8/2004 Eoff et al.
(Continued)

FOREIGN PATENT DOCUMENTS

WO    WO 2001/066487 A1    9/2001
WO    WO 2014/070503 A1    5/2014
(Continued)

OTHER PUBLICATIONS

Collier et al., "Theoretical Development and Validation of a Sharp Front Model of the Dewatering of a Slurry by an Absorbent Substrate," Journal of Physics D: Applied Physics, Jun. 15, 2007, vol. 40, No. 13, pp. 4049-4054.
(Continued)

*Primary Examiner* — Crystal J Miller
(74) *Attorney, Agent, or Firm* — Haynes and Boone, LLP (57) ABSTRACT

Methods and systems are presented in this disclosure for evaluating performance of cement fluid-loss-control additives and generating cement slurries with controlled fluid losses for cementing operations. A normalized pressure along a wellbore length can be first specified based on properties of the proposed cement slurry formulation and properties of the wellbore in a subterranean formation. A volume loss of a fluid of the proposed cement slurry formulation can be calculated using a model associated with the fluid obtained based at least in part on the normalized pressure and properties of the fluid. The proposed cement slurry formulation can be manipulated by adding one or more fluid-loss control additives to the proposed cement
(Continued)

slurry formulation based on the calculated volume loss of the fluid to produce a preferred cement slurry.

21 Claims, 4 Drawing Sheets (51) Int. Cl.
*C04B 28/02* (2006.01)
*E21B 47/00* (2012.01)
*C04B 103/00* (2006.01)
*C04B 103/10* (2006.01)
*C04B 103/20* (2006.01)
*C04B 103/40* (2006.01)
*C04B 103/46* (2006.01)

(52) U.S. Cl.
CPC .. *E21B 47/0005* (2013.01); *C04B 2103/0088* (2013.01); *C04B 2103/10* (2013.01); *C04B 2103/20* (2013.01); *C04B 2103/408* (2013.01); *C04B 2103/46* (2013.01)

(58) Field of Classification Search
CPC ............ C04B 2103/10; C04B 2103/20; C04B 2103/408; C04B 2103/46; C04B 28/02
See application file for complete search history.

(56) References Cited

U.S. PATENT DOCUMENTS

| 2007/0028811 A1* | 2/2007 | Luke | C04B 12/005 |
| | | | 106/813 |
| 2010/0212892 A1* | 8/2010 | Santra | C04B 28/32 |
| | | | 166/250.14 |
| 2017/0096874 A1* | 4/2017 | Parsons | E21B 33/14 |

FOREIGN PATENT DOCUMENTS

| WO | WO-2014070503 A1 * | 5/2014 | ............ E21B 33/14 |
| WO | WO 2016/085454 A1 | 6/2016 | |

OTHER PUBLICATIONS

De Souza et al., "A Unified Approach to Model Elasto-Viscoplastic Thixotropic Yield-Stress Materials and Apparent Yield-Stress Fluids," Rheologica Acta, Jul. 2013, vol. 52, Issue 7, pp. 673-694.

De Souza, "Thixotropic Elasto-Viscoplastic Model for Structured Fluids," Soft Matter, Mar. 2011, vol. 7, pp. 2471-2483.

International Search Report and the Written Opinion of the International Search Authority, or the Declaration, dated Apr. 20, 2016, PCT/US2015/043870, 17 pages, ISA/KR.

Philip, "The Theory of Infiltration: 4. Sorptivity and Algebraic Infiltration Equations" Soil Science, Sep. 1957, vol. 84, Issue 3, pp. 257-264.

* cited by examiner

METHODS FOR EVALUATING PERFORMANCE OF CEMENT FLUID-LOSS-CONTROL ADDITIVES FOR FIELD APPLICATIONS

PRIORITY

The present application is a U.S. National Stage patent application of International Patent Application No. PCT/US2015/043870, filed on Aug. 5, 2015, the benefit of which is claimed and the disclosure of which is incorporated herein by reference in its entirety.

TECHNICAL FIELD

The present disclosure generally relates to methods for producing cement slurries and, more particularly, to methods for evaluating performance of cement fluid-loss-control additives and generating cement slurries with controlled fluid losses.

BACKGROUND

Subterranean formation operations (e.g., stimulation operations, sand control operations, completion operations, and the like) often involve placing a cement column around a casing or liner string in a wellbore. The cement column is formed by pumping a cement slurry downhole through the casing and upwards through the annular space between the outer casing wall and the formation face of the wellbore. After placement, the cement slurry develops into a gel and then cures in the annular space, thereby forming a column of hardened cement that, inter alia, supports and positions the casing in the wellbore and bonds the exterior surface of the casing to the subterranean formation. Among other things, the cement column may keep fresh water zones from becoming contaminated with produced fluids from within the wellbore. As used herein, the term "fluid" refers to liquid phase and gas phase materials. The cement column may also prevent unstable formations from caving in, thereby reducing the chance of a casing collapse or a stuck drill pipe. Finally, the cement column forms a solid barrier to prevent fluid loss to the formation, contamination of production zones, or undesirable fluid invasion into the well. Therefore, the degree of success of a subterranean formation operation depends, at least in part, upon the successful cementing of the wellbore casing.

The control of fluid losses to the formation is important in cementing and other types of downhole operations such as drilling and fracturing. If fluid losses occur in an uncontrolled manner, many problems may happen. For example, filtrate invasion from a cement column into production zones may cause formation damage, which may reduce the production potential of a reservoir. In cementing, fluid losses above a safe threshold can lead to failure of the operation, which may require expensive remedial cementing operations. In the worst cases, fluid losses may lead to gas invasion and migration, which can lead to the blow-out of the well.

The current recommended procedures to measure fluid loss data use a filter screen to simulate the formation permeability. By fixing the formation permeability, successive tests of different slurry designs with and without fluid-loss-control additives provide a comparison between cement slurries. As a result, designs that minimize filtration losses in specific conditions simulated in a laboratory can be obtained. However, this comparison provides only a relative measure between different cement slurry designs. For example, two cement slurries A and B can be tested and it can be found, for example, that slurry A has a smaller filtration loss than slurry B. However, the filtrate volume loss measured in laboratory conditions following the current recommended procedures cannot be used as an input to a mathematical model representing the physics of the filtrate loss. Consequently, this laboratory measurement cannot be used to predict the filtrate loss observed in the field. Therefore, it is desirable to measure the physical properties of the fluid of interest related to the filtration phenomenon.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Embodiments of the present disclosure relate to methods for evaluating performance of cement fluid-loss-control additives and generating cement slurries with controlled fluid losses. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It would also be apparent to one skilled in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" may encompass both an orientation of above and below. The apparatus may be otherwise oriented (rotated 90 degrees or at other orientations) and the spatially relative descriptors used herein may likewise be interpreted accordingly.

Illustrative embodiments and related methods of the present disclosure are described below in reference to FIGS. 1-5 as they might be employed for evaluating performance of cement fluid-loss-control additives. Such embodiments and related methods may be practiced, for example, using a computer system as described herein. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

In some embodiments, the cement slurry may comprise a base fluid and a cementitious material. Any aqueous base fluid suitable for use in a subterranean operation (e.g., drilling or completion operations) may be used in the cement slurry described in some embodiments herein. Suitable base fluids for use in the embodiments described herein may include, but are not limited to, freshwater, saltwater (e.g., water containing one or more salts dissolved therein), brine (e.g., saturated saltwater), seawater, and any combination thereof. Generally, the base fluid may be from any source, provided, for example, that it does not contain an excess of compounds that may undesirably affect other components in the salt-tolerant cement slurry. In some embodiments, the base fluid may be included in an amount sufficient to form a pumpable slurry. In some embodiments, the base fluid in the cement slurry may be foamed. In some embodiments, the base fluid may be included in the cement slurry in an amount of about 40% to about 200% by weight of ("w/w") the dry cementitious material. In other embodiments, the base fluid may be included in an amount of about 30% to about 150% w/w of the dry cementitious material.

The cementitious material may be any cementitious material suitable for use in subterranean operations. In preferred embodiments, the cementitious material is a hydraulic cement. Hydraulic cements harden by the process of hydration due to chemical reactions to produce insoluble hydrates (e.g., calcium hydroxide) that occur independent of the cement's water content (i.e., hydraulic cements can harden even under constantly damp conditions). Thus, hydraulic cements are preferred because they are capable of hardening regardless of the water content of a particular subterranean formation. Suitable hydraulic cements include, but are not limited to Portland cement; Portland cement blends (e.g., Portland blast-furnace slag cement and/or expansive cement); non-Portland hydraulic cement (e.g., super-sulfated cement, calcium aluminate cement, and/or high magnesium-content cement); and any combination thereof. In some embodiments, the cementitious material is present in an amount of about 20% to about 70% w/w of the salt-tolerant cement slurry.

In some embodiments, the cement slurry may additionally comprise a pozzolanic material. Pozzolanic materials may aid in increasing the density and strength of the cementitious material. As used herein, the term "pozzolanic material" refers to a siliceous material that, while not being cementitious, is capable of reacting with calcium hydroxide (which may be produced during hydration of the cementitious material). Because calcium hydroxide accounts for a sizable portion of most hydrated hydraulic cements, the combination of cementitious and pozzolanic materials may synergistically enhance the strength and quality of the cement. Any pozzolanic material that is reactive with the cementitious material may be used in the embodiments described herein. Suitable pozzolanic materials may include, but are not limited to silica fume; metakaolin; fly ash; diatomaceous earth; calcined or uncalcined diatomite; calcined fullers earth; pozzolanic clays; calcined or uncalcined volcanic ash; bagasse ash; pumice; pumicite; rice hull ash; natural and synthetic zeolites; slag; vitreous calcium aluminosilicate; and any combinations thereof. An example of a suitable commercially-available pozzolanic material is POZ-MIX®-A available from Halliburton Energy Services, Inc. of Houston, Tex. In some embodiments, the pozzolanic material may be present in an amount of about 5% to about 60% w/w of the dry cementitious material. In preferred embodiments, the pozzolanic material is present in an amount of about 5% to about 30% w/w of the dry cementitious material.

In some embodiments, the cement slurry may further comprise any cement additive capable of use in a subterranean operation. Cement additives may be added to the cement slurry to modify the characteristics of the slurry or cured cement. Such additives include, but are not limited to, a cement accelerator; a cement retarder; a fluid-loss additive; a cement dispersant; a cement extender; a weighting agent; a lost circulation additive; and any combinations thereof. The cement additives may be in any form, including powder form or liquid form.

The purpose of the present disclosure is to describe methods for selecting desirable cement slurry properties that are able to reduce filtration losses to a preferred level, while respecting safety conditions for each field operation. Methods are presented herein that use material properties of a cement slurry such as conductivity and suction characteristics that, coupled to a mathematical model, are able to define a critical fluid (filtration) loss volume, above which risks associated with high filtration losses may appear in a field. Once the critical fluid loss value is identified, the methods presented herein teach how to obtain cement slurries with filtration-related properties within this safety limit. In particular, the methods presented in this disclosure use material properties of a cement slurry to describe limiting fluid loss values necessary to avoid fluid invasion into cement column and gas migration problems.

Methods for evaluating filtration losses of cement slurries, in particular fluid-loss-control additives are presented in this disclosure. An overview of the methods and description on how to calculate critical fluid loss values respecting important safety criteria for field applications are first provided in the present disclosure. Experimental methods to select suitable fluid-loss-control additives are also described. Embodiments of the present disclosure relate to a mathematical model that takes into account physical properties of a fluid within a cement slurry, which can be used to calculate critical fluid loss values.

Figure 1:
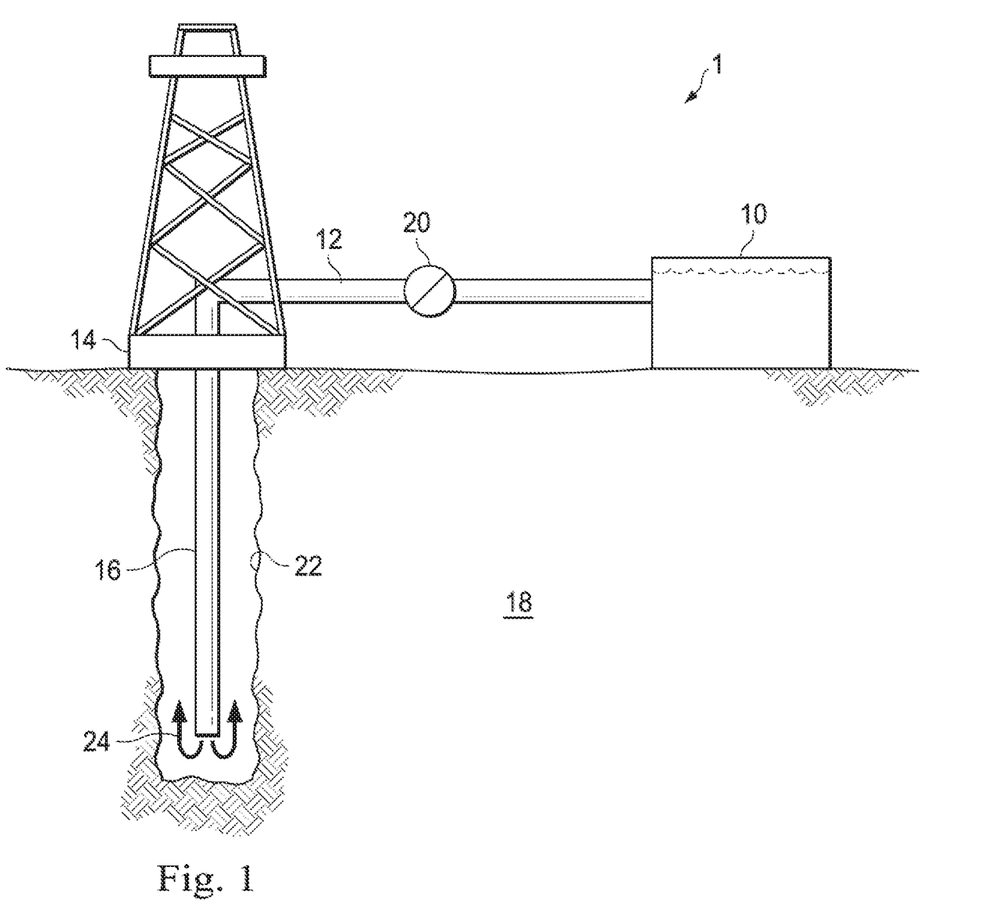
FIG. 1 is a system configured for delivering cement slurries with fluid-loss-control additives to a downhole location, according to certain embodiments of the present disclosure.

FIG. 1 shows an illustrative schematic of a system that can deliver the cement slurries with fluid-loss-control additives determined based on the methods described herein, according to embodiments of the present disclosure. It should be noted that while FIG. 1 generally depicts a land-based system, it is to be recognized that like systems may be operated in subsea locations as well. As depicted in FIG. 1, system 1 may include mixing tank 10, in which the cement slurry with fluid-loss-control additives may be formulated. Again, in some embodiments, the mixing tank 10 may represent or otherwise be replaced with a transport vehicle or shipping container configured to deliver or otherwise convey the cementing fluid to the well site. The cement slurry with fluid-loss-control additives may be conveyed via line 12 to wellhead 14, where the cement slurry enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the cement slurry with fluid-loss-control additives may subsequently return up the wellbore in the annulus between the tubular 16 and the wellbore 22 as indicated by flow lines 24. In other embodiments, the cementing fluid may be reverse pumped down through the annulus and up tubular 16 back to the surface, without departing from the scope of the disclosure. Pump 20 may be configured to raise the pressure of the cement slurry to a desired degree before its introduction into tubular 16 (or annulus). It is to be recognized that system 1 is merely illustrative in nature and various additional components may be present that have not necessarily been depicted in FIG. 1 in the interest of clarity. Nonlimiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing where the cement is introduced into an annulus between a tubular and the wellbore and returns to the wellhead through the tubular, and the like).

It is also to be recognized that the disclosed cement slurry with fluid-loss-control additives may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electrohydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

A mathematical model is built in the present disclosure to obtain a critical fluid loss rate (or equivalently a fluid volume loss) for field applications. In one or more embodiments, this critical fluid floss rate (fluid volume loss) can be defined in relation to a field application in which a pressure of a cement column, P, is close to a pressure of a subterranean formation, $P_{formation}$. This represents a pertinent definition since it is well accepted in the art that gas invasion problems may occur if $P<P_{formanon}$. For certain embodiments, the methods for evaluating filtration (fluid) losses of cement slurries presented herein are based on the dimensionless pressure, P*, defined as:

$$P^* = \frac{P}{P_{formation}}, \quad (1)$$

and the critical fluid loss rate can be calculated by setting $P^*=1+\varepsilon=P_{crit}^*$, wherein $\varepsilon$ is an additional safety factor to be chosen in each filed application. By specifying a value for $P_{crit}^*$ and applying the mathematical model described and discussed in more detail below, it can be possible to calculate a maximum safe value for the fluid loss rate, that is, the critical fluid loss value, $v_{crit}$, representing a critical velocity of a fluid (filtrate) transferring from a cement column to a subterranean formation. Values of the fluid loss rate above $v_{crit}$ would risk gas invasion, and values of the fluid loss rate below $v_{crit}$ are within the safe range.

For some embodiments, there are certain other parameters of cement slurries that may influence the risks of gas invasion into a cement column. In one or more embodiments, the parameters influencing the risks of gas invasion may comprise at least one of: rheological properties, shrinkage, or compressibility of fluids and cement slurries. The mathematical model presented herein takes these parameters into account, and it calculates one $v_{crit}$ (e.g., a critical fluid loss rate) for each set of these parameters. Different additive formulations for cement slurries can then be evaluated based on the calculated critical fluid loss rate, and the additive formulations characterized by fluid loss rate values below $v_{crit}$ can be recommended for cementing operations. Methods described in the present disclosure are reliable and economical approaches for selecting preferred fluid-loss-control additives for each cementing operation. In addition, methods presented herein ensure that the cement column will not suffer fluid invasion from a subterranean formation.

In one or more embodiments, once the critical fluid loss rate value is calculated for a given application (e.g., cementing operation), it is desirable to relate the critical fluid loss rate to material properties associated with at least one of fluids (filtrates), cement slurries or subterranean formations. In other words, it is desirable to find fluid-loss-control additives for cement slurries that provide fluid loss rates equal or smaller than the critical fluid loss rate value, $v_{crit}$. Traditionally, static and dynamic fluid loss tests can be employed by utilizing a filter screen to simulate the formation permeability. The present disclosure provides an alternative approach that does not depend on the filter screen.

For certain embodiments, properties that influence fluid loss may comprise at least one of: sorptivity (S), desorptivity (R), or transfer sorptivity (A), which are functions of pressure, hydraulic conductivity and geometrical parameters. Sorptivity (S) represents a measurable quantity of a porous material derived from unsaturated flow theory for soil physics, and describes the material ability to absorb water; desorptivity (R) provides information on how a material would desorb water; transfer sorptivity (A) relates a water transfer from one material to another material, e.g., the transfer of filtrate from the cement slurry to the formation.

In one or more embodiments, the aforementioned material characteristics (e.g., sorptivity, desorptivity, transfer sorptivity) can be measured from experimental tests. Examples of experimental tests suitable for measuring sorptivity include direct gravimetric methods, methods based on penetration distance, and methods based on measurement of moisture distributions. Desorptivity measurements can be obtained from, for example, Capillary Suction Time (CST) tests and/or from Controlled Permeability Formwork (CPF) tests.

For certain embodiments, the observed velocity of fluid (filtrate) loss from the cement slurry to the formation can be related to the transfer sorptivity (A) by:

$$v_f = \frac{A}{2} t^{-\frac{1}{2}}, \quad (2)$$

where $v_f$ represents the velocity (rate) of fluid loss, A denotes the transfer sorptivity and t represents an elapsed time from placing a cement column around a casing or liner string in a wellbore. Once the critical fluid loss velocity, $v_{crit}$, is calculated, this value can replace $v_f$ in equation (2) and be related to the material properties (e.g., the transfer sorptivity). The tranfer sorptivity A can be related to sorptivity and desorptivity as given by:

$$\frac{1}{A^2} = \frac{1}{R^2} + \frac{1}{S^2}, \quad (3)$$

where R represents the desorptivity of the slurry, and S denotes the sorptivity of the formation. Combining equations (2) and (3), the fluid loss phenomenon of the slurry can be written as:

$$v_f = \frac{RS}{2\sqrt{R^2 + S^2}} t^{-\frac{1}{2}}. \quad (4)$$

Once the critical fluid loss velocity, $v_{crit}$, is calculated, this value can replace $v_f$ in equation (4) and be related to the material properties, such as the desorptivity of the slurry and sorptivity of the formation. Therefore, by calculating the critical fluid loss velocity (rate), critical values of material properties (e.g., sorptivity, desorptivity, and transfer sorptivity) can be obtained and utilized as guidance for determining fluid-loss-control additives for cement slurries.

Figure 2:
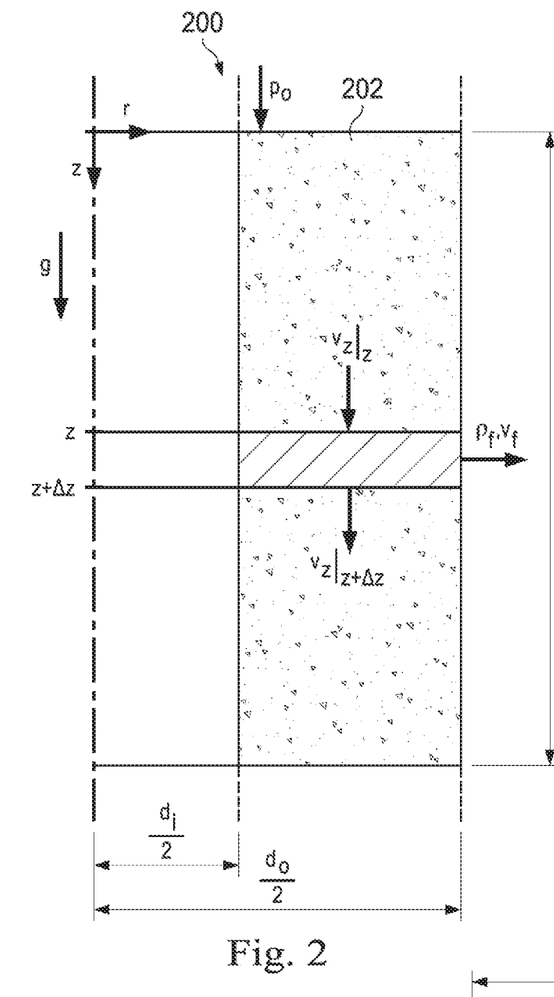
FIG. 2 is a schematic drawing of a cement column, according to certain embodiments of the present disclosure.

The mathematical model applied to compute fluid losses (e.g., fluid loss rate or fluid volume loss) along the cement column is derived herein from coupling mass and momentum balances with a time-dependent rheological model, wherein compressibility and gelation are also taken into account. As a matter of simplicity, the annulus is described in the present disclosure as a 1-D model, and a schematic drawing of an example cement column 200 is illustrated in FIG. 2. In FIG. 2, z and r respectively represent the axial and radial coordinates of the cement column 200, $P_0$ is a pressure on the top of the cement column, g is the gravitational acceleration, and $\rho_f$ and $v_f$ are variables related to fluid loss and represent the density and velocity (rate) of the filtrate. The diameter of the casing and of the wellbore are taken as the inner diameter, $d_i$, and outer diameter, $d_o$, respectively. The annular space distance is given by $$\frac{d_o - d_i}{2},$$

and $v_z$ describes the downward velocity, which is a function of time t and depth z.

In one or more embodiments, the mass and momentum balances can be written for the annular space 202 illustrated in FIG. 2 as:

$$\frac{4d_o}{d_o^2 - d_i^2} \rho_f v_f = -\frac{\partial \rho}{\partial t} - \frac{\partial (\rho v_z)}{\partial z}, \quad (5)$$

$$\rho\left(\frac{\partial v_z}{\partial t} + v_z \frac{\partial v_z}{\partial z}\right) = -\frac{\partial P}{\partial z} + \frac{\partial \tau_{zz}}{\partial z} + \frac{4d_o}{d_0 - d_i}\overline{\tau}_{rz} + \rho g_z. \quad (6)$$

where $d_o$ is the diameter of the well, $d_i$ is the diameter of the casing, $\rho_f$ is the density of fluid loss from the cement to the subterranean formation, $v_f$ is the velocity (rate) of fluid loss from the cement to the subterranean formation, $\rho$ is the density within the cement, $v_z$ is the downward velocity of the cement at well depth z, P is the pressure inside the cement column at well depth z and time t, $\tau_{zz}$ is the normal stress of the cement fluid, $\overline{\tau}_{rz}$ is the average shear stress of an annular element of the cement column, and $g_z$ is the gravitational acceleration at well depth z. The fluid compressibility can be taken into account in the model by considering the slightly compressible material hypothesis. In this way, the density of the fluid can be described as a function of pressure and shrinkage, i.e., $\tau(P,Sh)$.

A constitutive model is desired to conclude the mathematical model for computing fluid losses along the cement column. In one or more embodiments, the constitutive model can relate shear and normal stresses with the velocity field in equation (6). A time-dependent rheological model can be chosen for this purpose. This rheological model is based on the modified nonlinear Jeffrey's mechanical analog and it is composed by two main equations, namely, a stress equation given in equation (7), and an evolution equation for the microstructure given by equation (12). The parameters required to solve equations (7) and (12) are given by equations (8)-(11) and (13)-(15), respectively.

Figure 3:
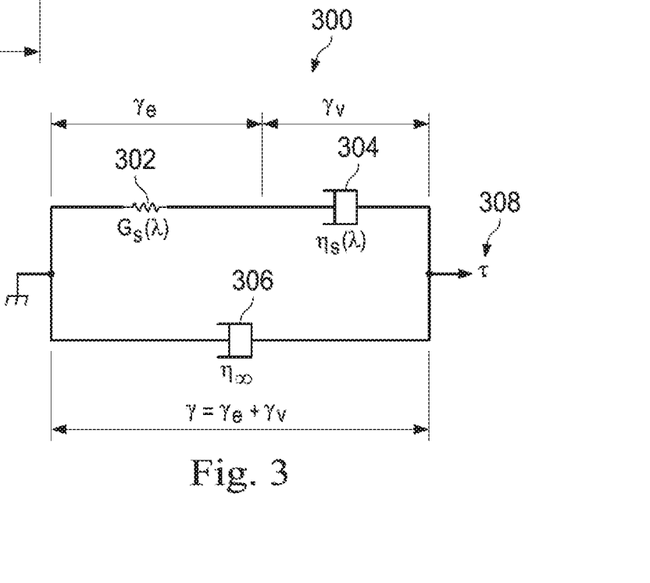
FIG. 3 is a mechanical analog of a time-dependent rheological model of a fluid in a cement slurry, according to certain embodiments of the present disclosure.

FIG. 3 illustrates a mechanical analog 300 of the time-dependent rheological model. Mechanical analog 300 includes a structural elastic modulus 302, a structural viscosity function 304, a viscosity function 306, and a shear stress 308. Mechanical analog 300 may be used to describe the thixotropic, viscoelastic, and yielding behaviors of fluid. Mechanical analog 300 is described by two main equations: stress equation (7) and structure equation (12). In certain embodiments, the stress of fluid may be calculated according to equation (7):

$$\dot{\tau} + \frac{\tau}{\theta_1(\lambda)} = \frac{\eta_\infty}{\theta_2(\lambda)}\dot{\gamma} + \eta_\infty \ddot{\gamma}, \tag{7}$$

wherein: $\tau$ is the shear stress; $\dot{\tau}$ is the shear stress rate; $\lambda$ is the structure parameter of fluid; $\theta_1(\lambda)$ is the relaxation time of fluid for a given level of structure, $\lambda$; $\theta_2(\lambda)$ is the retardation time of fluid for a given level of structure, $\lambda$; $\dot{\gamma}$ is the shear rate of fluid; $\ddot{\gamma}$ is the derivative of the shear rate of fluid; and $\eta_\infty$ is the viscosity of fluid in an unstructured state ($\lambda$=0).

The time-dependent rheological model of equation (7) may be solved by calculating the parameters of equations (8)-(11):

$$\theta_1(\lambda) = \left(\frac{\eta_v(\lambda) - \eta_\infty(\lambda)}{G_S(\lambda)}\right), \tag{8}$$

$$\theta_2(\lambda) = \left(1 - \frac{\eta_\infty}{\eta_v(\lambda)}\right)\frac{\eta_\infty}{G_S(\lambda)}, \tag{9}$$

$$G_S(\lambda) = G_0 e^{m\left(\frac{1}{\lambda} - \frac{1}{\lambda_0}\right)}, \tag{10}$$

$$\eta_v(\lambda) = \eta_\infty e^\lambda, \tag{11}$$

wherein: $\eta_v(\lambda)$ is the purely viscous character of the viscosity of fluid represented by $\eta_S + \eta_\infty$; $\eta_S$ is the structure viscosity function of fluid; $G_S(\lambda)$ is the structural elastic modulus of fluid; $G_0$ is the structural elastic modulus of the completely structured fluid; and $\lambda_0$ is the structure parameter of the fully structured fluid.

In certain embodiments, a structure parameter of fluid is calculated to define how fluid behaves in schematic model of the cement column 200 in FIG. 2. In some embodiments, structure parameter $\lambda$ describes the state of fluid. The evolution of structure parameter $\lambda$ may vary from 0 to 1, with 0 corresponding to a completely unstructured state and 1 corresponding to a completely structured state. In certain embodiments, equation (12) may be used to calculate structure parameter $\lambda$:

$$\frac{d\lambda}{dt} = \frac{1}{t_{eq}}\left[\left(\frac{1}{\lambda} - \frac{1}{\lambda_0}\right)^a - \left(\frac{\lambda}{\lambda_{eq}(\tau)}\right)^b \left(\frac{1}{\lambda_{eq}(\tau)} - \frac{1}{\lambda_0}\right)^a\right], \tag{12}$$

wherein: $t_{eq}$ is the equilibrium time; a, b are dimensionless positive constants; $d\lambda/dt$ is the time derivative of the structure parameter; and $\lambda_{eq}(\tau)$ is the equilibrium structure parameter of fluid as a function of the shear stress.

In certain embodiments, evolution equation (12) may be solved by calculating the parameters of equations (13) and (14):

$$\lambda_{eq}(\dot{\gamma}) = \ln\left(\frac{\eta_{eq}(\tau)}{\eta_\infty}\right), \tag{13}$$

$$\eta_{eq}(\dot{\gamma}) = \left(1 - e^{-\frac{\eta_0 \dot{\gamma}}{\tau_0}}\right)\left(\frac{\tau_0 - \tau_{0d}}{\dot{\gamma}}e^{-\frac{\dot{\gamma}}{\dot{\gamma}_{0d}}} + \frac{\tau_{0d}}{\dot{\gamma}} + K\dot{\gamma}^{n-1}\right) + \eta_\infty, \tag{14}$$

wherein: $\eta_{eq}(\tau)$ is the equilibrium viscosity as a function of fluid shear stress; $\lambda_{eq}(\dot{\gamma})$ is the equilibrium structure parameter of fluid as a function of shear rate; $\eta_0$ is the viscosity of fluid in a fully structured state ($\lambda$=1); $\tau_0$ is the static yield stress of fluid; $\tau_{0d}$ is the dynamic yield stress of fluid; n is the power-law index; K is the consistency index; and $\eta_{eq}(\dot{\gamma})$ is the equilibrium viscosity of fluid as a function of the shear rate.

The shear rate required to calculate the mass and momentum balance equations can be estimated using equation (15):

$$\dot{\gamma} = \frac{4v_z}{d_o - d_i}. \tag{15}$$

In certain embodiments, the inputs of the model presented herein may comprise well dimensions, density and formation pressure corrected by the safety factor described in equation (1). In addition, fluid properties, such as rheological properties and compressibility of the cement slurry are required. The rheological properties of the fluids required by the model can be obtained from steady state and transient tests in a rheometer, while density and compressibility can be obtained with oil industry's standard tests. In one or more embodiments, the model presented herein can be solved via a finite element method, a finite difference method, a finite volume method, a spectral method, or other discretization methods.

The term "methods" is used in this disclosure intentionally to comprise any method that takes advantage of the teachings contained herein. Examples of variations of the above description include but are not limited to: (i) 2D or 3D versions of the mathematical model; (ii) the use of other rheological models, including other methods that capture the time-dependent-elasto-viscoplastic behavior of cement slurries; (iii) different expressions to estimate the characteristic shear rate, $\dot{\gamma}$, e.g., equation (15) multiplied by a different factor; (iv) different values for dimensionless pressure. The methods described in the present disclosure can also be applied to wells of different geometries, e.g., horizontal and directional well. The teachings of this disclosure can also be employed with fluid loss expressions different from the one shown herein as long as a comparison to what happens in the field is achieved. The description of this disclosure focuses on cementing applications, but the teaching presented herein are also applicable to drilling and fracturing fluids, and to water-based and oil-based fluids.

Figure 4:
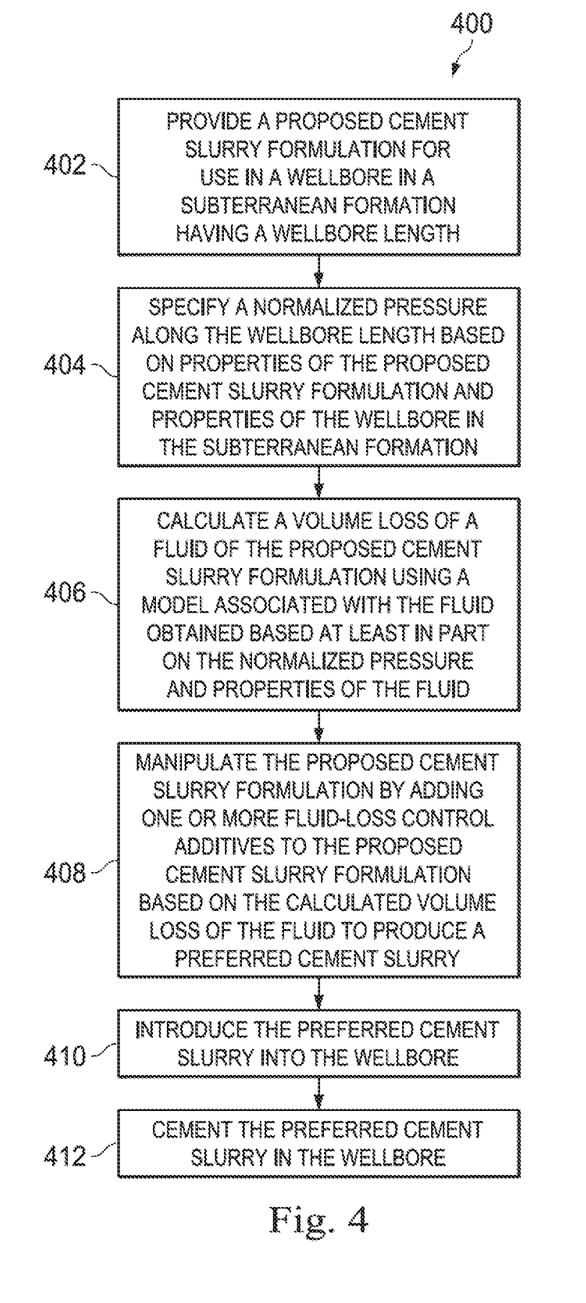
FIG. 4 is a flow chart of a method for evaluating performance of cement fluid-loss-control additives and generating cement slurries with controlled fluid losses, according to certain embodiments of the present disclosure.

Discussion of an illustrative method of the present disclosure will now be made with reference to FIG. 4, which is a flow chart 400 of a method for evaluating performance of cement fluid-loss-control additives and generating cement slurries with controlled fluid losses for cementing operations, according to certain embodiments of the present disclosure. The method begins at 402 by providing a proposed cement slurry formulation for use in a wellbore in a subterranean formation having a wellbore length. At 404, a normalized pressure along the wellbore length may be specified based on properties of the proposed cement slurry formulation and properties of the wellbore in the subterranean formation. At 406, a volume loss of a fluid of the proposed cement slurry formulation may be calculated using a model associated with the fluid obtained based at least in part on the normalized pressure and properties of the fluid. At 408, the proposed cement slurry formulation may be manipulated by adding one or more fluid-loss control additives to the proposed cement slurry formulation based on the calculated volume loss of the fluid to produce a preferred cement slurry. At 410, the preferred cement slurry may be introduced into the wellbore. At 412, the preferred cement slurry may be cemented in the wellbore.

Figure 5:
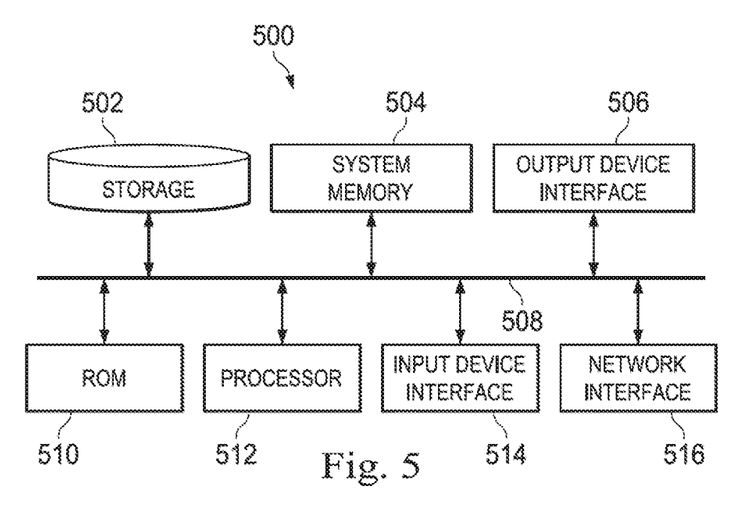
FIG. 5 is a block diagram of an illustrative computer system in which embodiments of the present disclosure may be implemented.

FIG. 5 is a block diagram of an illustrative computing system 500 in which embodiments of the present disclosure may be implemented adapted for evaluating fluid-loss-control additives and generating cement slurries with controlled fluid losses for cementing and other field applications. For example, the operations of method 400 of FIG. 4, as described above, may be implemented using the computing system 500. The computing system 500 can be a computer, phone, personal digital assistant (PDA), or any other type of electronic device. Such an electronic device includes various types of computer readable media and interfaces for various other types of computer readable media. As shown in FIG. 5, the computing system 500 includes a permanent storage device 502, a system memory 504, an output device interface 506, a system communications bus 508, a read-only memory (ROM) 510, processing unit(s) 512, an input device interface 514, and a network interface 516.

The bus 508 collectively represents all system, peripheral, and chipset buses that communicatively connect the numerous internal devices of the computing system 500. For instance, the bus 508 communicatively connects the processing unit(s) 512 with the ROM 510, the system memory 504, and the permanent storage device 502.

From these various memory units, the processing unit(s) 512 retrieves instructions to execute and data to process in order to execute the processes of the subject disclosure. The processing unit(s) can be a single processor or a multi-core processor in different implementations.

The ROM 510 stores static data and instructions that are needed by the processing unit(s) 512 and other modules of the computing system 500. The permanent storage device 502, on the other hand, is a read-and-write memory device. This device is a non-volatile memory unit that stores instructions and data even when the computing system 500 is off. Some implementations of the subject disclosure use a mass-storage device (such as a magnetic or optical disk and its corresponding disk drive) as the permanent storage device 502.

Other implementations use a removable storage device (such as a floppy disk, flash drive, and its corresponding disk drive) as the permanent storage device 502. Like the permanent storage device 502, the system memory 504 is a read-and-write memory device. However, unlike the storage device 502, the system memory 504 is a volatile read-and-write memory, such a random access memory. The system memory 504 stores some of the instructions and data that the processor needs at runtime. In some implementations, the processes of the subject disclosure are stored in the system memory 504, the permanent storage device 502, and/or the ROM 510. For example, the various memory units include instructions for computer aided pipe string design based on existing string designs in accordance with some implementations. From these various memory units, the processing unit(s) 512 retrieves instructions to execute and data to process in order to execute the processes of some implementations.

The bus 508 also connects to the input and output device interfaces 514 and 506. The input device interface 514 enables the user to communicate information and select commands to the computing system 500. Input devices used with the input device interface 514 include, for example, alphanumeric, QWERTY, or T9 keyboards, microphones, and pointing devices (also called "cursor control devices"). The output device interfaces 506 enables, for example, the display of images generated by the computing system 500. Output devices used with the output device interface 506 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 5, the bus 508 also couples the computing system 500 to a public or private network (not shown) or combination of networks through a network interface 516. Such a network may include, for example, a local area network ("LAN"), such as an Intranet, or a wide area network ("WAN"), such as the Internet. Any or all components of the computing system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the operations of method 400 of FIG. 4, as described above, may be implemented using the computing system 500 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs implemented on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of operations in the processes disclosed is an illustration of exemplary approaches. Based upon design preferences, it is understood that the specific order or hierarchy of operations in the processes may be rearranged, or that all illustrated operations be performed. Some of the operations may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the illustrative methods described herein may be implemented by a system including processing circuitry or a computer program product including instructions which, when executed by at least one processor, causes the processor to perform any of the methods described herein.

A method for evaluating the performance of cement fluid-loss-control additives for field applications has been described in the present disclosure and may generally include: providing a proposed cement slurry formulation for use in a wellbore in a subterranean formation having a wellbore length; specifying a normalized pressure along the wellbore length based on properties of the proposed cement slurry formulation and properties of the wellbore in the subterranean formation; calculating a volume loss of a fluid of the proposed cement slurry formulation using a model associated with the fluid obtained based at least in part on the normalized pressure and properties of the fluid; manipulating the proposed cement slurry formulation by adding one or more fluid-loss control additives to the proposed cement slurry formulation based on the calculated volume loss of the fluid to produce a preferred cement slurry; introducing the preferred cement slurry into the wellbore; and cementing the preferred cement slurry in the wellbore. Further, a computer-readable storage medium with instructions stored therein has been described, instructions when executed by a computer cause the computer to perform a plurality of functions, including functions to: specify a normalized pressure along a length of a wellbore based on properties of a proposed cement slurry formulation and properties of the wellbore in a subterranean formation; calculate a volume loss of a fluid of the proposed cement slurry formulation using a model associated with the fluid obtained based at least in part on the normalized pressure and properties of the fluid; and manipulate the proposed cement slurry formulation by adding one or more fluid-loss control additives to the proposed cement slurry formulation based on the calculated volume loss of the fluid to produce a preferred cement slurry.

For the foregoing embodiments, the method or functions may include any one of the following operations, alone or in combination with each other: Manipulating the proposed cement slurry formulation comprises determining, based on the calculated volume loss of the fluid, one or more values associated with one or more properties of the proposed cement slurry formulation and the subterranean formation that influence a loss of the fluid from a cement column of the wellbore to the subterranean formation, and adding the one or more fluid-loss control additives to the proposed cement slurry formulation to change the one or more properties within boundaries that depend on the determined one or more values; Calculating the volume loss of the fluid comprises calculating at least one of a velocity of the fluid or a density of the fluid; Calculating the volume loss of the fluid of the proposed cement slurry formulation using the model comprises solving the model based on analytical methods, using either the entire model, modifications of equations representing the model, or simplifications of the equations; Calculating the volume loss of the fluid of the proposed cement slurry formulation using the model comprises solving the model based on a discretization method.

The one or more properties comprise at least one of: sorptivity of the subterranean formation, desorptivity of the proposed cement slurry formulation, or transfer sorptivity related to transferring the fluid from the proposed cement slurry formulation to the subterranean formation; The proposed cement slurry formulation comprises the fluid and a cementitious material; The proposed cement slurry formulation is manipulated to produce the preferred cement slurry having a loss of the fluid smaller than the calculated volume loss by adding the one or more fluid-loss control additives to the proposed cement slurry formulation; The proposed cement slurry formulation comprises at least one of: a pozzolanic material, a cement accelerator, a cement retarder, a fluid-loss additive, a cement dispersant, a cement extender, a weighting agent, or a lost circulation additive; The model is derived by coupling a mass balance and a momentum balance for a cement column of the wellbore with a time-dependent rheology model of the fluid; The time-dependent rheology model comprises at least one of: relaxation time of the fluid, retardation time of the fluid; viscosity of the fluid in an unstructured state, viscosity of the fluid in a structured state, structural viscosity of the fluid, equilibrium viscosity of the fluid, shear stress of the fluid, static yield stress of the fluid, dynamic yield stress of the fluid, shear rate of the fluid, shear rate that marks the transition in stress from static yield stress to dynamic yield stress, structure parameter of the fluid, structural parameter of the fluid in structured and unstructured state, structural elastic modulus of the fluid, structural elastic modulus of the fluid in an fully structured state, positive dimensionless constants, power-law index, or equilibrium time; The time-dependent rheology model comprises at least one of elasticity, viscoplasticity, structural development of the fluid, or changes in mechanical behavior of the fluid; Inputs of the model comprise at least one of: the normalized pressure that includes a safety factor, dimensions of the wellbore, a density of the proposed cement slurry formulation, rheological properties of the fluid, or a compressibility of the proposed cement slurry formulation; The discretization method comprises at least one of a finite element method, a finite difference method, a finite volume method, or a spectral method.

Likewise, a system for evaluating performance of cement fluid-loss-control additives for field applications has been described and include at least one processor and a memory coupled to the processor having instructions stored therein, which when executed by the processor, cause the processor to perform functions, including functions to: specify a normalized pressure along a length of a wellbore based on properties of a proposed cement slurry formulation and properties of the wellbore in a subterranean formation; calculate a volume loss of a fluid of the proposed cement slurry formulation using a model associated with the fluid obtained based at least in part on the normalized pressure and properties of the fluid; and manipulate the proposed cement slurry formulation by adding one or more fluid-loss control additives to the proposed cement slurry formulation based on the calculated volume loss of the fluid to produce a preferred cement slurry.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods described in the present disclosure accurately predict the fluid volume losses (fluid loss rates) in field applications and relate filtration properties to material properties. The methods presented herein assist one of ordinary skill in the art to find optimized physical properties of slurries that satisfy two important conditions simultaneously: prevent fluid invasion and be cost-effective for field applications. The methods described herein evaluate filtration rate (fluid loss rate) and efficiency based on yield stress requirement and filtration related proprieties, such as desorptivity and sorptivity. These methods are based on the underlying physics, considering, in the risk evaluation, the main reported causes for fluid invasion, namely, fluid loss, compressibility and rheology changes. The methods presented in this disclosure use a transient rheological model and take into at least one of account elasticity, viscoplasticity, structure development, or possible changes of the mechanical behavior of the fluids involved. Due to fewer assumptions considered in the mathematical model, the predictive capability of the method presented herein is considerably improved compared to existing methods. Based on the methods presented herein, inputs of the model and formation pressure, the critical filtration rate can be predicted. The methods described herein can also enable designing optimized fluid-loss-control additives for field applications, by calculating the required filtration related properties of cement slurries.

While specific details about the above embodiments have been described, the above hardware and software descriptions are intended merely as example embodiments and are not intended to limit the structure or implementation of the disclosed embodiments. For instance, although many other internal components of computing system 500 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

What is claimed is:

1. A method comprising:
   providing a proposed cement slurry formulation for use in a wellbore in a subterranean formation having a wellbore length;
   specifying a normalized pressure along the wellbore length based on properties of the proposed cement slurry formulation and properties of the wellbore in the subterranean formation;
   calculating a critical fluid loss rate of a fluid of the proposed cement slurry formulation using a model associated with the fluid and based at least in part on the normalized pressure and properties of the fluid, wherein:
     the critical fluid loss rate represents a critical velocity of the fluid transferring from a cement column of the wellbore to the subterranean formation,
     the normalized pressure ($P^*$) is defined as $P^*=P/P_{formation}$, wherein P is a pressure of the cement column and $P_{formation}$ is a pressure of the subterranean formation, and
     the critical fluid loss rate is calculated by setting $P^*=1+\varepsilon=P^*_{critical}$, wherein $\varepsilon$ is an additional safety factor specific to the wellbore in the subterranean formation and $P^*_{critical}$ is a specified value;
   determining one or more fluid-loss control additives that provide a fluid loss rate equal to or less than the calculated critical fluid loss rate;
   adding the one or more fluid-loss control additives to the proposed cement slurry formulation to produce a cement slurry;
   introducing the cement slurry into the wellbore; and
   cementing the cement slurry in the wellbore.

2. The method of claim 1, further comprising:
   determining, based on the calculated critical fluid loss rate of the fluid, one or more values associated with one or more properties of the proposed cement slurry formulation and the subterranean formation that influence a loss of the fluid from the cement column to the subterranean formation.

3. The method of claim 2, wherein the one or more properties comprise at least one of: sorptivity of the subterranean formation, desorptivity of the proposed cement slurry formulation, or transfer sorptivity related to transferring the fluid from the proposed cement slurry formulation to the subterranean formation.

4. The method of claim 1, wherein calculating the critical fluid loss rate of the fluid comprises calculating at least one of a velocity of the fluid or a density of the fluid.

5. The method of claim 1, wherein the proposed cement slurry formulation comprises:
   the fluid and a cementitious material;
   at least one of: a pozzolanic material, a cement accelerator, a cement retarder, a fluid-loss additive, a cement dispersant, a cement extender, a weighting agent, or a lost circulation additive.

6. The method of claim 1, wherein the model is derived by coupling a mass balance and a momentum balance for the cement column with a time-dependent rheology model of the fluid.

7. The method of claim 6, wherein the time-dependent rheology model comprises:
   at least one of: relaxation time of the fluid, retardation time of the fluid; viscosity of the fluid in an unstructured state, viscosity of the fluid in a structured state, structural viscosity of the fluid, equilibrium viscosity of the fluid, shear stress of the fluid, static yield stress of the fluid, dynamic yield stress of the fluid, shear rate of the fluid, shear rate that marks the transition in stress from static yield stress to dynamic yield stress, structure parameter of the fluid, structural parameter of the fluid in structured and unstructured state, structural elastic modulus of the fluid, structural elastic modulus of the fluid in an fully structured state, positive dimensionless constants, power-law index, or equilibrium time; or
   at least one of elasticity, viscoplasticity, structural development of the fluid, or changes in mechanical behavior of the fluid.

8. The method of claim 1, wherein inputs of the model comprise at least one of: the normalized pressure that includes the additional safety factor, dimensions of the wellbore, a density of the proposed cement slurry formulation, rheological properties of the fluid, or a compressibility of the proposed cement slurry formulation.

9. The method of claim 1, wherein calculating the critical fluid loss rate of the fluid of the proposed cement slurry formulation using the model comprises:
   solving the model based on analytical methods, using either the entire model, modifications of equations representing the model, or simplifications of the equations; or
   solving the model based on a discretization method.

10. The method of claim 9, wherein the discretization method comprises at least one of a finite element method, a finite difference method, a finite volume method, or a spectral method.

11. A system for evaluating performance of cement fluid-loss-control additives, the system comprising:
    at least one processor; and
    a memory coupled to the processor having instructions stored therein, which when executed by the processor, cause the processor to perform functions, including functions to:
      specify a normalized pressure along a length of a wellbore based on properties of a proposed cement slurry formulation and properties of the wellbore in a subterranean formation;
      calculate a critical fluid loss rate of a fluid of the proposed cement slurry formulation using a model associated with the fluid and based at least in part on the normalized pressure and properties of the fluid, wherein:
        the critical fluid loss rate represents a critical velocity of the fluid transferring from a cement column of the wellbore to the subterranean formation,
        the normalized pressure ($P^*$) is defined as $P^*=P/P_{formation}$, wherein P is a pressure of the cement column and $P_{formation}$ is a pressure of the subterranean formation, and
        the critical fluid loss rate is calculated by setting $P^*=1+\varepsilon=P^*_{critical}$, wherein $\varepsilon$ is an additional safety factor specific to the wellbore in the subterranean formation and $P^*_{critical}$ is a specified value;
      determine one or more fluid-loss control additives that provide a fluid loss rate equal to or less than the calculated critical fluid loss rate; and
      add the one or more fluid-loss control additives to the proposed cement slurry formulation to produce a cement slurry.

12. The system of claim 11, wherein the functions performed by the processor further include functions to:

determine, based on the calculated critical fluid loss rate of the fluid, one or more values associated with one or more properties of the proposed cement slurry formulation and the subterranean formation that influence a loss of the fluid from a cement column of the wellbore to the subterranean formation.

13. The system of claim 12, wherein the one or more properties comprise at least one of: sorptivity of the subterranean formation, desorptivity of the proposed cement slurry formulation, or transfer sorptivity related to transferring the fluid from the proposed cement slurry formulation to the subterranean formation.

14. The system of claim 11, wherein the functions to calculate the critical fluid loss rate of the fluid performed by the processor include functions to calculate at least one of a velocity of the fluid or a density of the fluid.

15. The system of claim 11, wherein the model is derived by coupling a mass balance and a momentum balance for a cement column of the wellbore with a time-dependent rheology model of the fluid.

16. The system of claim 15, wherein the time-dependent rheology model comprises:
at least one of: relaxation time of the fluid, retardation time of the fluid; viscosity of the fluid in an unstructured state, viscosity of the fluid in a structured state, structural viscosity of the fluid, equilibrium viscosity of the fluid, shear stress of the fluid, static yield stress of the fluid, dynamic yield stress of the fluid, shear rate of the fluid, shear rate that marks the transition in stress from static yield stress to dynamic yield stress, structure parameter of the fluid, structural parameter of the fluid in structured and unstructured state, structural elastic modulus of the fluid, structural elastic modulus of the fluid in an fully structured state, positive dimensionless constants, power-law index, or equilibrium time; or
at least one of elasticity, viscoplasticity, structural development of the fluid, or changes in mechanical behavior of the fluid.

17. The system of claim 11, wherein inputs of the model comprise at least one of: the normalized pressure that includes the additional safety factor, dimensions of the wellbore, a density of the proposed cement slurry formulation, rheological properties of the fluid, or a compressibility of the proposed cement slurry formulation.

18. The system of claim 11, wherein the functions to calculate the critical fluid loss rate of the fluid of the proposed cement slurry formulation using the model performed by the processor include:
functions to solve the model based on analytical methods, using either the entire model, modifications of equations representing the model, or simplifications of the equations; or
functions to solve the model based on a discretization method.

19. The system of claim 18, wherein the discretization method comprises at least one of a finite element method, a finite difference method, a finite volume method, or a spectral method.

20. A computer-readable storage medium having instructions stored therein, which when executed by a computer cause the computer to perform a plurality of functions, including functions to:
specify a normalized pressure along a length of a wellbore based on properties of a proposed cement slurry formulation and properties of the wellbore in a subterranean formation;
calculate a critical fluid loss rate of a fluid of the proposed cement slurry formulation using a model associated with the fluid and based at least in part on the normalized pressure and properties of the fluid, wherein:
the critical fluid loss rate represents a critical velocity of the fluid transferring from a cement column of the wellbore to the subterranean formation,
the normalized pressure ($P^*$) is defined as $P^*=P/P_{formation}$, wherein $P$ is a pressure of the cement column and $P_{formation}$ is a pressure of the subterranean formation, and
the critical fluid loss rate is calculated by setting $P^*=1+\varepsilon=P^*_{critical}$, wherein $\varepsilon$ is an additional safety factor specific to the wellbore in the subterranean formation and $P^*_{critical}$ is a specified value;
determine one or more fluid-loss control additives that provide a fluid loss rate equal to or less than the calculated critical fluid loss rate; and
add the one or more fluid-loss control additives to the proposed cement slurry formulation to produce a cement slurry.

21. The computer-readable storage medium of claim 20, wherein the instructions further perform functions to:
determine, based on the calculated critical fluid loss rate of the fluid, one or more values associated with one or more properties of the proposed cement slurry formulation that influence a loss of the fluid from a cement column of the wellbore to the subterranean formation.

* * * * *

UNITED STATES PATENT AND TRADEMARK OFFICE
CERTIFICATE OF CORRECTION

PATENT NO. : 10,647,905 B2
APPLICATION NO. : 15/744567
DATED : May 12, 2020
INVENTOR(S) : Elias D. Rodrigues, Rafael M. Oliveira and Flavio H. Marchesini

Page 1 of 1

It is certified that error appears in the above-identified patent and that said Letters Patent is hereby corrected as shown below:

In the Claims

At Column 17, Line 52, Claim 5: Please add "or" after ";".

Signed and Sealed this
Thirtieth Day of June, 2020

Andrei Iancu
*Director of the United States Patent and Trademark Office*